(12) United States Patent
Codilian et al.

(10) Patent No.: US 6,735,033 B1
(45) Date of Patent: May 11, 2004

(54) METHOD FOR RECOVERING FROM SHOCK EVENTS OCCURRING TO A DISK DRIVE DURING DATA WRITE OPERATIONS TO IMPROVE DATA RELIABILITY

(75) Inventors: Raffi Codilian, Irvine, CA (US); Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 229 days.

(21) Appl. No.: 10/015,147

(22) Filed: Dec. 10, 2001

(51) Int. Cl.⁷ .......................... G11B 15/04; G11B 5/596
(52) U.S. Cl. .................. 360/60; 360/69; 360/75; 360/77.08; 360/31; 360/77.01; 360/77.02
(58) Field of Search .................. 360/60, 69, 75, 360/53, 77.02, 77.05, 77.08, 31, 77.01, 78.04, 78.09, 73.03

(56) References Cited

U.S. PATENT DOCUMENTS

| | | | | |
|---|---|---|---|---|
| 6,018,431 A | * | 1/2000 | Carlson et al. | 360/60 |
| 6,115,200 A | * | 9/2000 | Allen et al. | 360/60 |
| 6,178,058 B1 | * | 1/2001 | Pan et al. | 360/60 |
| 6,226,140 B1 | * | 5/2001 | Serrano et al. | 360/60 |
| 6,313,964 B1 | * | 11/2001 | Lamberts et al. | 360/75 |
| 6,429,990 B2 | * | 8/2002 | Serrano et al. | 360/60 |

* cited by examiner

Primary Examiner—David Hudspeth
Assistant Examiner—Natalia Figueroa
(74) Attorney, Agent, or Firm—Milad G. Shara, Esq.; Robroy R. Fawcett, Esq.

(57) ABSTRACT

The invention relates to a method for recovering from shock event to a disk drive. Embedded servo wedges are read to generate position error signal (PES) values. The disk drive is transitioned to a write unsafe state if a PES value is greater than a write unsafe (WUS) threshold and is less than a shock detection threshold. The disk drive is transitioned to a shock recovery state if a PES value is greater than the shock detection threshold. The disk drive is transitioned from the shock recovery state to the write unsafe state if a first number of consecutively generated PES values remain less than the WUS threshold. The disk drive is transitioned from the write unsafe state to the on-track state if a second number of consecutively generated PES values remain less than the arrival threshold, which threshold is less than the WUS threshold.

22 Claims, 3 Drawing Sheets

METHOD FOR RECOVERING FROM SHOCK EVENTS OCCURRING TO A DISK DRIVE DURING DATA WRITE OPERATIONS TO IMPROVE DATA RELIABILITY

BACKGROUND OF THE INVENTION

1. Field of the Invention

The present invention relates to digital data storage, and more particularly, to techniques for recovering from shock events occurring to a disk drive during data write operations to improve data reliability.

2. Description of the Prior Art

Market demand for increased storage capacity has pushed disk drive designers to increase the drive's track density, often expressed as tracks per inch or TPI. Due to the increased track density, an external shock event may undesirably force the disk drive's read/write head from the desired track during track following and cause the head to vibrate about the track's centerline. The head vibrations may be sufficient large to impact the reliability of stored data.

Accordingly, there exists a need for a technique that enables a disk drive to recover from a shock event in a manner that improves the reliability of the stored data.

SUMMARY OF THE INVENTION

The present invention may be embodied in a method performed by a disk drive for recovering from shock events to improve data reliability. The disk drive includes a read/write head and a rotating disk having a data storage surface. The storage surface has a plurality of embedded servo wedges and a plurality of concentric data tracks with data sectors. The disk drive further includes an on-track state wherein writing of data is enabled, a write unsafe state wherein writing of data is disabled, and a shock recovery state wherein writing of data is disabled. In the method, an arrival threshold, a write unsafe threshold and a shock detection threshold are provided. The write unsafe threshold is greater than the arrival threshold, and the shock detection threshold is greater than the write unsafe threshold. The embedded servo wedges on the rotating disk are read to generate position error signal values with respect to a selected data track. The disk drive is transitioned from the on-track state to the write unsafe state if a position error signal value is greater than the write unsafe threshold and less than the shock detection threshold. The disk drive is transitioned from the on-track state or from the write unsafe state to the shock recovery state if a position error signal value is greater than the shock detection threshold. The disk drive is transitioned from the shock recovery state to the write unsafe state if a first number of consecutively generated position error signal values remain less than the write unsafe threshold. Also, the disk drive is transitioned from the write unsafe state to the on-track state if a second number of consecutively generated position error signal values remain less than the arrival threshold.

In more detailed features of the invention, the first number may be based on the magnitude of a position error signal value that exceeds the shock detection threshold. The first number may be greater than about one-half of the total number of servo wedges per track and less than about the total number of servo wedges per track. For example, the first number may be equal to or greater than about ninety, and the second number may be a predetermined number that is equal to about seven. The centers of the data tracks are separated by a track-to-track spacing, and the shock detection threshold may be about 30% to 40% of a value associated with the track-to-track spacing, the write unsafe threshold may be about 16% to 18% of a value associated with the track-to-track spacing, and the arrival threshold may be about 11% to 14% of a value associated with the track-to-track spacing. Thus, the shock detection threshold may be about twice the write unsafe threshold.

Another embodiment of the invention may reside in a method that likewise improves data reliability. In the method, each position error signal value is monitored during the data write operation. If a monitored position error signal value exceeds a write unsafe threshold, then the following steps are performed. Data writing is disabled. If the monitored position error signal value further exceeds a shock event threshold, which threshold is greater than the write unsafe threshold, then the disk drive waits for a first number of consecutively generated position error signal values that are less than the write unsafe threshold. The disk drive waits for a second number of consecutively generated position error signal values that are less than an arrival threshold, which threshold is less than the write unsafe threshold. The disk drive then enables writing of data.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
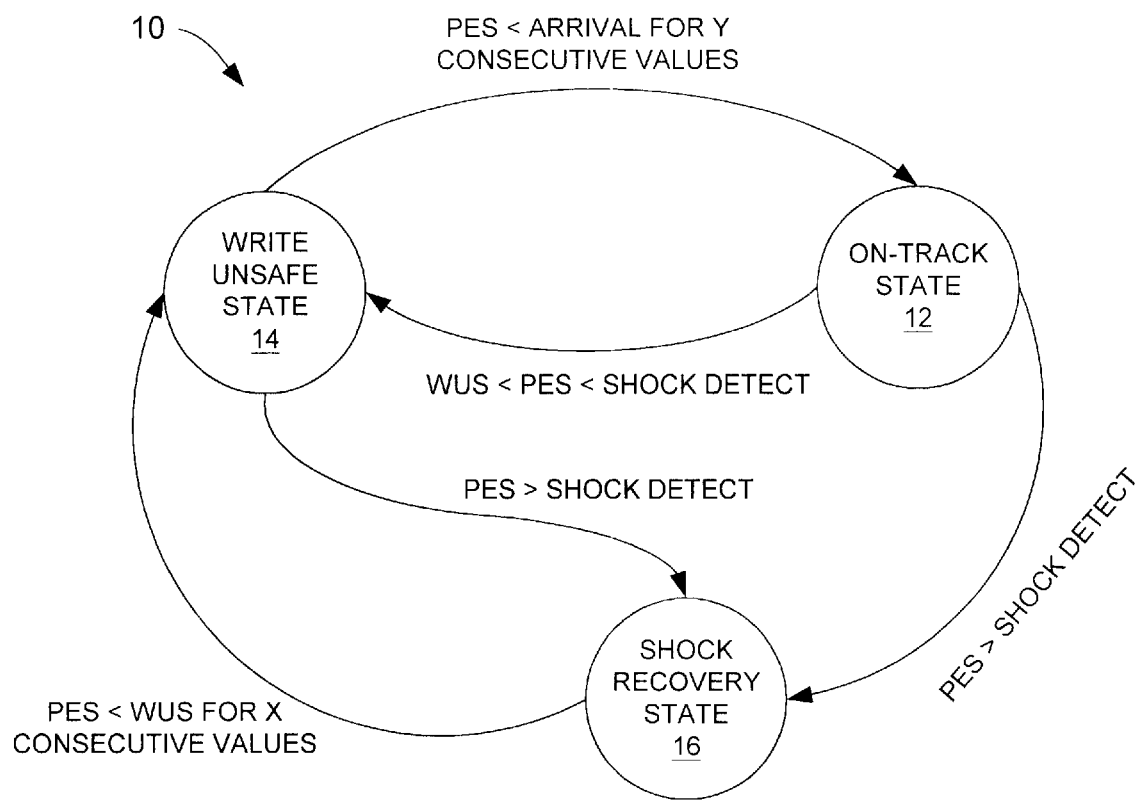
FIG. 1 is a state diagram of an embodiment of a method performed by a disk drive for recovering from shock events to improve data reliability, according to the present invention.
Figure 2:
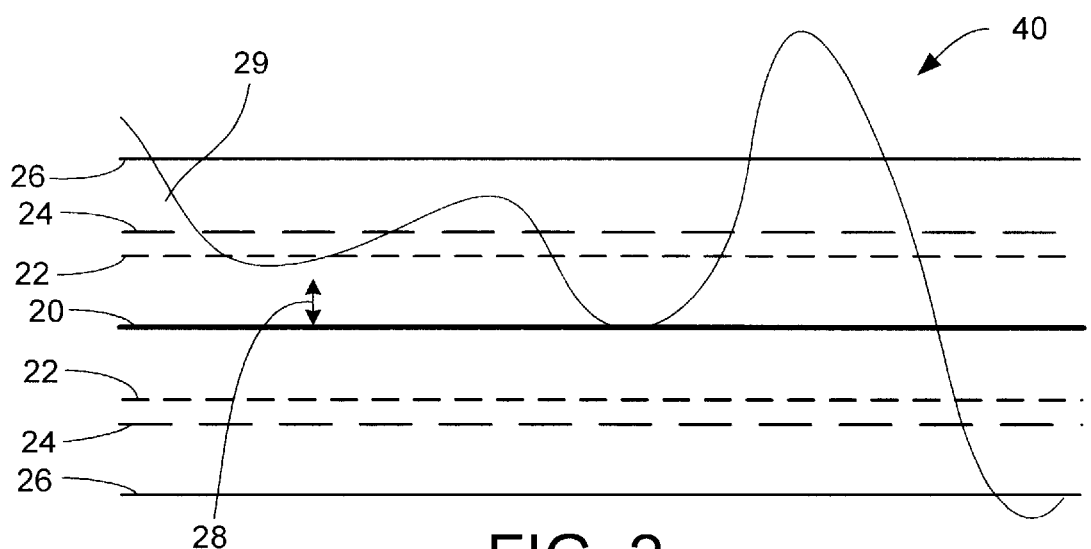
FIG. 2 is a schematic diagram of a data track showing an arrival threshold, a write unsafe threshold, and a shock detection threshold.
Figure 3:
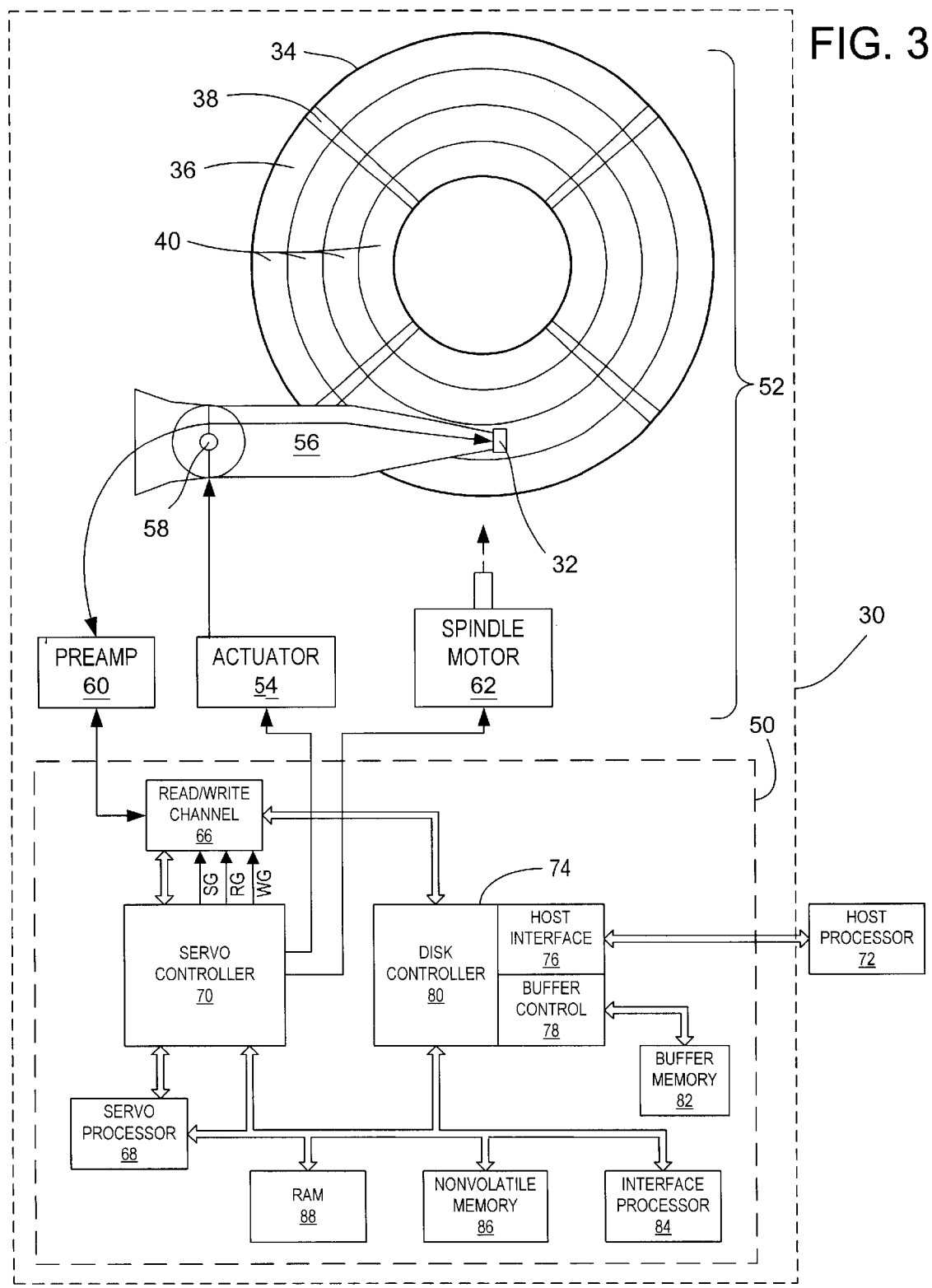
FIG. 3 is a block diagram showing a disk drive for implementing the shock recovery methods of the present invention.

With reference to FIGS. 1, 2 and 3, the present invention may be embodied in a method 10 performed by a disk drive 30 for recovering from shock events to improve data reliability. The disk drive includes a read/write head 32 and a rotating disk 34 having a data storage surface 36. The storage surface has a plurality of embedded servo wedges 38 and a plurality of concentric data tracks 40 with data sectors. The disk drive further includes an on-track state 12 wherein writing of data is enabled, a write unsafe state 14 wherein writing of data is disabled, and a shock recovery state 16 wherein writing of data is disabled. In the method, an arrival threshold 22, a write unsafe (WUS) threshold 24, and a shock detection threshold 26 are provided. The write unsafe threshold is greater than the arrival threshold, and the shock detection threshold is greater than the WUS threshold. The embedded servo wedges on the rotating disk are read to generate position error signal (PES) values 28 with respect to a selected data track. The disk drive is transitioned from the on-track state 12 to the write unsafe state 14 if a PES value is greater than the WUS threshold 24 and less than the shock detection threshold 26. The disk drive is transitioned from the on-track state 12 or from the write unsafe state 14 to the shock recovery state 16 if a PES value is greater than the shock detection threshold 26. The disk drive is transitioned from the shock recovery state 16 to the write unsafe state 14 if a first number X of consecutively generated PES values are less than the WUS threshold 24. Also, the disk drive is transitioned from the write unsafe state 14 to the on-track state 12 if a second number Y of consecutively generated PES values are less than the arrival threshold 22.

The combination of the shock recovery state 16 and the write unsafe state 14 provides advantages in improving data reliability. A head trajectory 29 is shown in FIG. 2 with respect to a track centerline 20, the arrival threshold 22, the WUS threshold 24, and the shock event threshold 26. After a track seek, the disk drive 30 transitions to the on-track state 12 and enables writing of data. When a PES value 28 exceeds the WUS threshold, the disk drive transitions to the write unsafe state and remains in the state until the second number of consecutively generated PES values are within the arrival window, after which arrival time window, the disk drive transitions to the on-track state. In response to a shock event, the head 32 may oscillate about the selected track 40 for several cycles before the energy of the shock event dissipates. Because the peak magnitude of the head oscillation exceeds the shock event threshold, the disk drive transitions to the shock recovery state. During the oscillation cycles, the head may transitorily pass within the arrival threshold for sufficient time such that, absent the shock recovery state, the disk drive would have transitioned from the write-unsafe state to the on-track state. The oscillatory motion of the head would soon cause the head to move outside of the WUS threshold. Allowing data to be written during this transitory on-track state may result in less reliable data. The shock recovery state attempts to prevent transition from the write unsafe state to the on-track state until after the energy of the shock event dissipates.

Advantageously, the disk drive 30 waits nearly a complete rotation of the disk 36 before transitioning from the shock recovery state 16 to the write unsafe state 14. The first number X may be greater than about one-half of the total number of servo wedges 38 per track. Once a count of consecutive servo wedges or PES values 28 (each servo wedge results in the generation of a corresponding PES value) within the WUS threshold 24 reaches the first number, the disk drive allows transition from the shock recovery state to the write unsafe state 14. To avoid waiting for unnecessary disk rotations, the first number may be less than the total number of servo wedges per track. For example, a representative disk may have 116 embedded servo wedges. A typical arrival time window may correspond to between 6 and 8 wedges. Allowing for several arrival time windows and a margin for rewriting of data immediately preceding the shock event, the first number may be equal to or just greater than about ninety, and the second number Y may be a predetermined number that is equal to about seven. However, if the shock event's magnitude is sufficiently large, it may be advantageous for the first number to be based on two disk rotations. Accordingly, the first number may be based on the magnitude of a PES value that exceeds the shock detection threshold.

The centers of the data tracks 40 are separated by a track-to-track spacing, and the shock detection threshold 26 may be about 30% to 40% of a value associated with the track-to-track spacing, the write unsafe threshold 24 may be about 16% to 18% of a value associated with the track-to-track spacing, and the arrival threshold 22 may be about 11% to 14% of a value associated with the track-to-track spacing. Typical values for the shock detection, write unsafe, and arrival thresholds may be about 32%, 16%, and 11%, respectively. Thus, the shock detection threshold may be about twice the write unsafe threshold.

Figure 4:
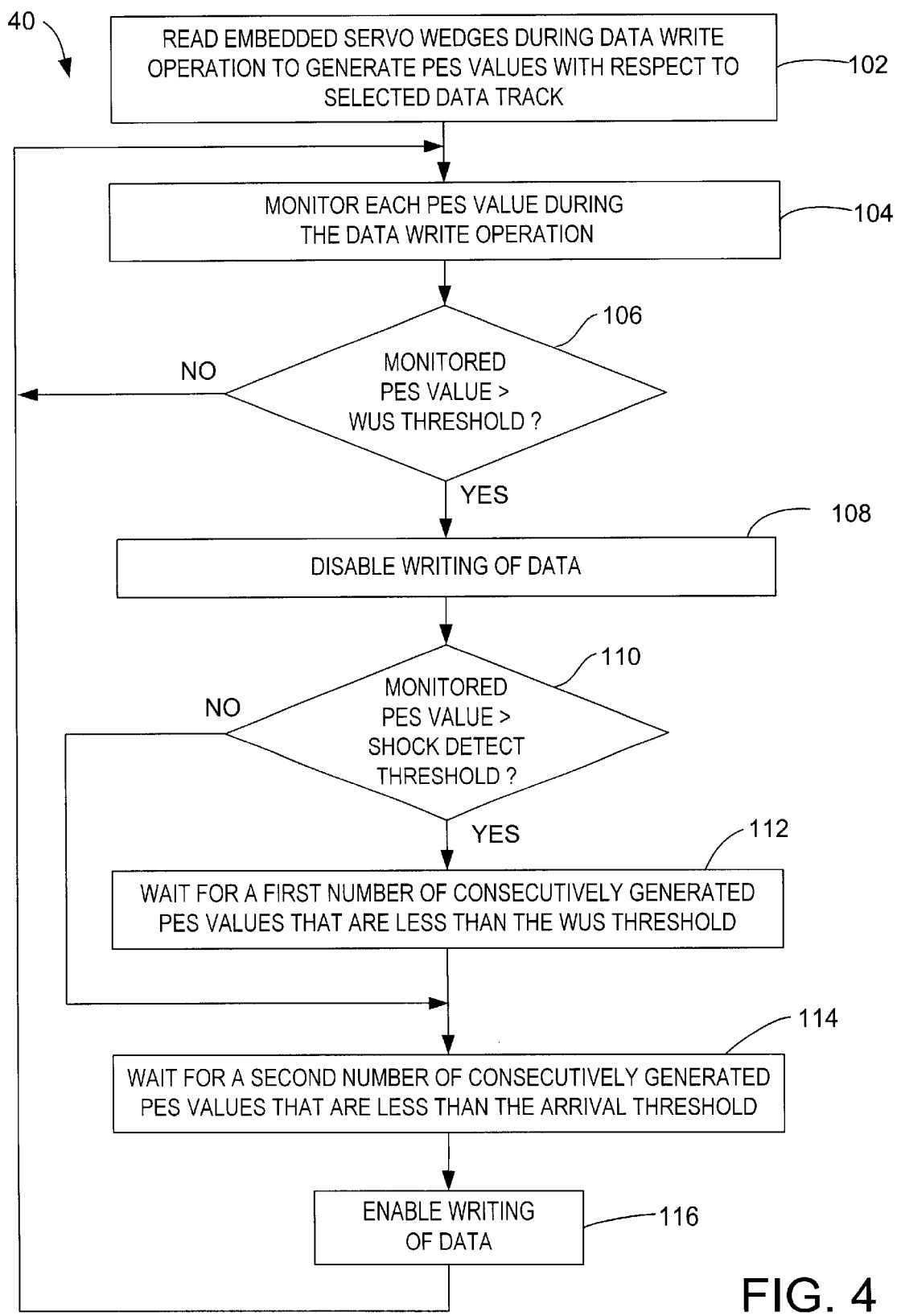
FIG. 4 is a flow diagram of an embodiment of another method for recovering from shock events to improve data reliability, according to the present invention.

With reference to FIG. 4, another embodiment of the invention may reside in a method 100 that likewise improves data reliability. In the method, the embedded servo wedges 38 are read during a data write operation to generate PES values 28 with respect to a selected data track 40 (block 102). Each PES value is monitored during the data write operation (block 104). If a monitored PES value exceeds the WUS threshold 24 (block 106), then the following steps are performed (blocks 108–116). Data writing is disabled (block 108). If the monitored PES value further exceeds the shock detection threshold 26 (block 110), then the disk drive 30 waits for a first number X of consecutively generated PES values that are less than the WUS threshold (block 112). The disk drive then waits for a second number Y of consecutively generated PES values that are less than an arrival threshold 22 (block 114). The disk drive then enables writing of data (block 116).

The techniques for shock estimation and write termination control may be implemented in a disk drive 30 having a programmable microprocessor. A shown in FIG. 3, the disk drive 10 may include a disk control system 50 and a head disk assembly (HDA) 52. The HDA includes one or more magnetic disks 34 having the data storage surface 36 with the plurality of concentric tracks 40 recorded thereon, the head 32 for writing user data to or reading user data from a selected one of the tracks in response to a host command during operation of the disk drive, and an actuator 54 for positioning the head over the selected track. The head in present disk drives is a giant magneto-resistive (GMR) read element and a thin film inductive write element. The actuator is typically implemented as a voice coil motor (VCM) which rotates an actuator arm 56 about a pivot 58 in order to position the head radially over the disk in response to control signals from the disk control system. The HDA further includes a preamplifier 60 and a spindle motor 62 for rotating the disk. The head communicates with the disk control system via the preamplifier. The preamplifier provides an amplified signal to a read/write channel 66 of disk control system.

The disk control system 50 implements a servo control loop which causes the head 32 to follow the centerline 20 (FIG. 2) of a selected track 40 in an operation generally referred to as "track following." A servo processor 68 commands a servo controller 70 to control the position of the head over a target track for subsequent execution of read or write commands. The servo processor receives a representative form of a position signal sensed by the head, via the preamplifier 60 and the read/write channel 66, and performs calculations to calculate a position error signal. The servo controller responds to digital commands from the servo processor responsive to the position error signal to provide a corresponding analog signal to the VCM. The servo processor also provides commands to the servo controller to maintain a substantially constant operational rotational velocity of the spindle motor 62.

A read gate RG and a write gate WG are electrically coupled between the servo controller 70 and read/write channel 66. The read gate RG must be asserted for reading of data from a disk surface through the read/write channel. Similarly, the write gate WG must be asserted before writing of data occurs on a disk surface through the read/write channel. A servo gate signal SG is enabled when reading servo data from a servo sector located on a disk surface. The servo controller will prohibit writing by not enabling the write gate WG whenever a PES value exceeds the WUS threshold.

The disk control system 50 also includes circuitry and processors that provide an intelligent disk control system interface between a host processor 72 and the HDA 52 for execution of read and write commands. The disk control system includes an integrated circuit host interface and disk controller (HIDC) 74 having a host interface 76, a buffer controller 78 and a disk controller 80. The host interface 76 communicates with the host processor. The buffer controller controls a buffer memory 82 employed for storing data from the host processor that is to be written to the disk 34 and for storing data read from the disk. The disk controller sends data to and receives data from the read/write channel 66 and provides for error correction and error detection on data read from the disk. An interface processor 84 handles the flow of data commands received by the host interface by sending commands to and reading status from the disk controller. The interface processor and the servo processor 68 may be advantageously implemented using a single processor of sufficient processing power. Information may be stored in nonvolatile memory 86 or in random access memory (RAM) 88 such as dynamic RAM (DRAM).

The method steps of the invention may be implemented by the servo processor 68, the servo controller 70, and the HIDC 74. Program code for the steps may be stored in the nonvolatile memory 86 and transferred to the RAM 88 during operation for execution by the servo processor 68.

We claim:

1. In a disk drive including a read/write head, a data storage surface, on a rotating disk, having a plurality of embedded servo wedges and a plurality of concentric data tracks with data sectors, an on-track state wherein writing of data is enabled, a write unsafe state wherein writing of data is disabled, and a shock recovery state wherein writing of data is disabled, a method for recovering from shock events to improve data reliability comprising steps for:

providing an arrival threshold, a write unsafe threshold that is greater than the arrival threshold, and a shock detection threshold that is greater than the write unsafe threshold;

reading the embedded servo wedges on the rotating disk to generate position error signal values with respect to a selected data track;

transitioning the disk drive from the on-track state to the write unsafe state if a position error signal value is greater than the write unsafe threshold and less than the shock detection threshold;

transitioning the disk drive from the on-track state or from the write unsafe state to the shock recovery state if a position error signal value is greater than the shock detection threshold;

transitioning the disk drive from the shock recovery state to the write unsafe state if a first number of consecutively generated position error signal values are less than the write unsafe threshold; and transitioning the disk drive from the write unsafe state to the on-track state if a second number of consecutively generated position error signal values are less than the arrival threshold.

2. A method for recovering from shock events as defined in claim 1, wherein the first number is based on the magnitude of a position error signal value that exceeds the shock detection threshold.

3. A method for recovering from shock events as defined in claim 1, wherein the first number is equal to or greater than about ninety.

4. A method for recovering from shock events as defined in claim 1, wherein second number is a predetermined number that is equal to about seven.

5. A method for recovering from shock events as defined in claim 1, wherein the first number is greater than about one-half of the total number of servo wedges per track and is less than about the total number of servo wedges per track.

6. A method for recovering from shock events as defined in claim 1, wherein centers of the data tracks are separated by a track-to-track spacing, and the shock detection threshold is about 30% to 40% of a value associated with the track-to-track spacing.

7. A method for recovering from shock events as defined in claim 1, wherein centers of the data tracks are separated by a track-to-track spacing, and the write unsafe threshold is about 16% to 18% of a value associated with the track-to-track spacing.

8. A method for recovering from shock events as defined in claim 1, wherein the centers of data tracks are separated by a track-to-track spacing, and the arrival threshold is about 11% to 14% of a value associated with the track-to-track spacing.

9. A method for recovering from shock events as defined in claim 1, wherein:

centers of the data tracks are separated by a track-to-track spacing;

the shock detection threshold is about 30% to 40% of a value associated with the track-to-track spacing;

the write unsafe threshold is about 16% to 18% of a value associated with the track-to-track spacing; and the arrival threshold is about 11% to 14% of a value associated with the track-to-track spacing.

10. A method for recovering from shock events as defined in claim 1, where the shock detection threshold is about twice the write unsafe threshold.

11. A disk drive having improved data reliability with respect to shock events, comprising:

a disk that rotates;

a read/write head, a data storage surface on the disk, the data storage surface having a plurality of embedded servo wedges and a plurality of concentric data tracks with data sectors; and a control system including;

an on-track state wherein writing of data is enabled;

a write unsafe state wherein writing of data is disabled;

a shock recovery state wherein writing of data is disabled an arrival threshold;

a write unsafe threshold that is greater than the arrival threshold;

a shock detection threshold that is greater than the write unsafe threshold;

means for generating position error signal values with respect to a selected data track based on reading of the embedded servo wedges;

means for transitioning the disk drive from the on-track state to the write unsafe state if a position error value is greater than the write unsafe threshold and less than the shock detection threshold;

means for transitioning the disk drive from the on-track state or from the write unsafe state to the shock recovery state if a position error value is greater than the shock detection threshold;

means for transitioning the disk drive from the shock recovery state to the write unsafe state if a first number of consecutively generated position error values are less than the write unsafe threshold; and means for transitioning the disk drive from the write unsafe state to the on-track state if a second number of consecutively generated position error values are less than the arrival threshold.

12. A disk drive as defined in claim 11, wherein the first number is based on the magnitude of a position error signal value that exceeds the shock detection threshold.

13. A disk drive as defined in claim 11, wherein the first number is equal to or greater than about ninety.

14. A disk drive as defined in claim 11, wherein the second number is a predetermined number that is equal to about seven.

15. A disk drive as defined in claim 11, wherein the first number is greater than about one-half of the total number of servo wedges per track and is less than about the total number of servo wedges per track.

16. A disk drive as defined in claim 11, wherein centers of the data tracks are separated by a track-to-track spacing, and the shock detection threshold is about 30% to 40% of a value associated with the track-to-track spacing.

17. A disk drive as defined in claim 11, wherein centers of the data tracks are separated by a track-to-track spacing, and the write unsafe threshold is about 16% to 18% of a value associated with the track-to-track spacing.

18. A disk drive as defined in claim 11, wherein centers of the data tracks are separated by a track-to-track spacing, and the arrival threshold is about 11% to 14% of a value associated with the track-to-track spacing.

19. A disk drive as defined in claim 11, wherein:
   centers of the data tracks are separated by a track-to-track spacing;
   the shock detection threshold is about 30% to 40% of a value associated with the track-to-track spacing;
   the write unsafe threshold is about 16% to 18% of a value associated with the track-to-track spacing; and
   the arrival threshold is about 11% to 14% of a value associated with the track-to-track spacing.

20. A disk drive as defined in claim 11, wherein the shock detection threshold is about twice the write unsafe threshold.

21. In a disk drive having a read/write head and a data storage surface, on a rotating disk, that includes a plurality of embedded servo wedges and a plurality of concentric data tracks having data sectors, a method for improving data reliability comprising steps for:
   reading the embedded servo wedges during a data write operation to generate position error signal values with respect to a selected data track;
   monitoring each position error signal value during the data write operation;
   if a monitored position error signal value exceeds a write unsafe threshold, then performing the following steps:
      disabling writing of data;
      if the monitored position error signal value further exceeds a shock event threshold, the shock event threshold being greater than the write unsafe threshold, then waiting for a first number of consecutively generated position error signal values that are less than the write unsafe threshold;
      waiting for a second number of consecutively generated position error signal values that are less than an arrival threshold, the arrival threshold being less than the write unsafe threshold; and
      enabling writing of data.

22. A method for improving data reliability as defined in claim 21, wherein, the first number is based on the magnitude of a position error signal value that exceeds the shock detection threshold.

* * * * *